US011514694B2

(12) United States Patent
Galeev et al.

(10) Patent No.: US 11,514,694 B2
(45) Date of Patent: Nov. 29, 2022

(54) TEACHING GAN (GENERATIVE ADVERSARIAL NETWORKS) TO GENERATE PER-PIXEL ANNOTATION

(71) Applicant: SAMSUNG ELECTRONICS CO., LTD., Suwon-si (KR)

(72) Inventors: Danil Fanilievich Galeev, Moscow (RU); Konstantin Sergeevich Sofiyuk, Moscow (RU); Danila Dmitrievich Rukhovich, Moscow (RU); Anton Sergeevich Konushin, Moscow (RU); Mikhail Viktorovich Romanov, Moscow (RU)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 84 days.

(21) Appl. No.: 17/018,461

(22) Filed: Sep. 11, 2020

(65) Prior Publication Data

US 2021/0089845 A1 Mar. 25, 2021

(30) Foreign Application Priority Data

Sep. 20, 2019 (RU) ................................ 2019129628
Dec. 9, 2019 (RU) ................................ 2019140414
Mar. 19, 2020 (KR) ........................ 10-2020-0034099

(51) Int. Cl.
*G06V 30/262* (2022.01)
*G06K 9/62* (2022.01)
(Continued)

(52) U.S. Cl.
CPC ......... *G06V 30/274* (2022.01); *G06K 9/6256* (2013.01); *G06N 3/08* (2013.01);
(Continued)

(58) Field of Classification Search
CPC ........ G06V 30/274; G06N 3/08; G06N 3/088; G06K 9/6256
See application file for complete search history.

(56) References Cited

U.S. PATENT DOCUMENTS 9,760,807 B2  9/2017  Zhou et al.
10,600,185 B2  3/2020  Yang et al.
(Continued)

FOREIGN PATENT DOCUMENTS

CN  107330444 A  11/2017
CN  107527318 A  12/2017
(Continued)

OTHER PUBLICATIONS

Iqbal, Talha and Hazrat Ali. "Generative Adversarial Network for Medical Images (MI-GAN)." Journal of Medical Systems 42 (2018): 1-11. (Year: 2018).*
(Continued)

*Primary Examiner* — Ross Varndell
(74) *Attorney, Agent, or Firm* — Sughrue Mion, PLLC

(57) ABSTRACT

A method and apparatus for joint image and per-pixel annotation synthesis with a generative adversarial network (GAN) are provided. The method includes: by inputting data to a generative adversarial network (GAN), obtaining a first image from the GAN; inputting, to a decoder, a first feature value that is obtained from at least one intermediate layer of the GAN according to the inputting of the data to the GAN; and obtaining a first semantic segmentation mask from the decoder according to the inputting of the first feature value to the decoder.

14 Claims, 13 Drawing Sheets

(51) Int. Cl.
  *G06T 7/10* (2017.01)
  *G06N 3/08* (2006.01)
  *G06V 10/40* (2022.01)
(52) U.S. Cl.
  CPC ............... *G06T 7/10* (2017.01); *G06V 10/40* (2022.01); *G06T 2207/20081* (2013.01); *G06T 2207/20084* (2013.01)

(56) References Cited

U.S. PATENT DOCUMENTS

| | | | |
|---|---|---|---|
| 10,678,256 | B2 | 6/2020 | Schulter et al. |
| 2017/0206431 | A1 | 7/2017 | Sun et al. |
| 2017/0243053 | A1 | 8/2017 | Li et al. |
| 2018/0293734 | A1 | 10/2018 | Lim et al. |
| 2019/0130278 | A1 | 5/2019 | Karras et al. |
| 2019/0244107 | A1* | 8/2019 | Murez ............. G06N 3/084 |
| 2019/0302290 | A1 | 10/2019 | Alwon |
| 2019/0355103 | A1* | 11/2019 | Baek ............. G06N 3/088 |
| 2020/0012895 | A1 | 1/2020 | Zhao et al. |
| 2020/0192389 | A1* | 6/2020 | ReMine ............. G06K 9/6257 |
| 2020/0211159 | A1 | 7/2020 | Migukin et al. |
| 2020/0250436 | A1* | 8/2020 | Lee ............. G06K 9/627 |

FOREIGN PATENT DOCUMENTS

| | | |
|---|---|---|
| CN | 108062753 A | 5/2018 |
| CN | 110059772 A | 7/2019 |
| CN | 110222690 A | 9/2019 |
| RU | 2 697 928 C1 | 8/2019 |
| WO | 2006/114003 A1 | 11/2006 |
| WO | 2018/184187 A1 | 10/2018 |

OTHER PUBLICATIONS

Tajbakhsh, Nima, et al. "Embracing imperfect datasets: A review of deep learning solutions for medical image segmentation," arXiv:1908.10454v1 [eess.IV] Aug. 27, 2019. (Year: 2019).*
Chen, Mickaël et al. "Unsupervised Object Segmentation by Redrawing." NeurIPS (2019). (Year: 2019).*
Rameen Abdal et al. "Image2StyleGAN: Howto Embed Images Into the StyleGAN Latent Space?" retrieved from arXiv:1904.03189v1 [cs.CV], Apr. 5, 2019 (21 pages total).
David Bau et al. "GAN dissection: Visualizing and understanding generative adversarial networks" retrieved from arXiv:1811.10597v1 [cs.CV], Nov. 26, 2018, (18 pages total).
Andrew Brock et al. "Neural photo editing with introspective adversarial networks" retrieved from arXiv:1609.07093v1 [cs.LG], Sep. 22, 2016, (10 pages total).
Liang-Chieh Chen et al. "Semantic image segmentation with deep convolutional nets and fully connected crfs" retrieved from arXiv:1412.7062v1 [cs.CV], Dec. 22, 2014 (11 pages total).
Liang-Chieh Chen et al. "Deeplab: Semantic image segmentation with deep convolutional nets, atrous convolution, and fully connected crfs" retrieved from perforarXiv:1606.00915v2 [cs.CV], May 12, 2017, (14 pages total).
Liang-Chieh Chen et al. "Rethinking Atrous Convolution for Semantic Image Segmentation" retrieved from arXiv:1706.05587v1 [cs.CV], Jun. 17, 2017 (10 pages total).
Liang-Chieh Chen et al. "Encoder-Decoder with Atrous Separable Convolution for Semantic Image Segmentation" ECCV, 2018 (18 pages total).
Tianqi Chen et al. "MXNet: A Flexible and Efficient Machine Learning Library for Heterogeneous Distributed Systems" retrieved from arXiv:1512.01274v1 [cs.DC], Dec. 3, 2015, (6 pages total).
Ian J. Goodfellow et al. "Generative Adversarial Nets", In Advances in neural information processing systems, 2014, ( 9 pages total).
Ishaan Gulrajani et al. "Improved Training of Wasserstein GANs" In Advances in Neural Information Processing Systems, 2017, (11 pages total).
Junyuan Xie et al. "Bag of Tricks for Image Classification with Convolutional Neural Networks" retrieved from arXiv:1812.01187v1 [cs.CV], Dec. 4, 2018, (10 pages total).
Xun Huang et al. "Multimodal Unsupervised Multimodal Unsupervised" ECCV, 2018, (18 pages total).
Phillip Isola et al. "Image-to-Image Translation with Conditional Adversarial Networks" retrieved from arXiv:1611.07004v1 [cs.CV], Nov. 21, 2016, (16 pages total).
Alexia Jolicoeur-Martineau "The relativistic discriminator: a key element missing from standard GAN" retrieved from arXiv:1807.00734v1 [cs.LG], Jul. 2, 2018, (24 pages total).
Tero Karras et al. "Progressive growing of GANs for improved quality, stability, and variation" retrieved from arXiv:1710.10196v1 [cs.NE], Oct. 27, 2017, (25 pages total).
Tero Karras "A Style-Based Generator Architecture for Generative Adversarial Networks" retrieved from arXiv:1812.04948v1 [cs.NE], Dec. 12, 2018, (12 pages total).
Christian Ledig et al. "Photo-Realistic Single Image Super-Resolution Using a Generative Adversarial Network" In Proceedings of the IEEE conference on computer vision and pattern recognition, 2017, (10 pages total).
Chuan Li et al. "Precomputed Real-Time Texture Synthesis with Markovian Generative Adversarial Networks" retrieved from arXiv:1604.04382v1 [cs.CV], Apr. 15, 2016, (17 pages total).
Ming-Yu Liu et al. "Few-Shot Unsupervised Image-to-Image Translation" retrieved from arXiv:1905.01723v1 [cs.CV], May 5, 2019, (19 pages total).
Jonathan Long et al. "Fully Convolutional Networks for Semantic Segmentation" In Proceedings of the IEEE conference on computer vision and pattern recognition, 2015, (10 pages total).
Lars Mescheder et al. "Which Training Methods for GANs do actually Converge?" retrieved from arXiv:1801.04406v4 [cs.LG], Jul. 31, 2018, (39 pages total).
Takeru Miyato et al. "Spectral normalization for generative adversarial networks" retrieved from arXiv:1802.05957v1 [cs.LG], Feb. 16, 2018, (26 pages total).
Takeru Miyato et al. "cGANs with projection discriminator" retrieved from arXiv:1802.05637v2 [ cs.LG], Aug. 15, 2018, (21 pages total).
Kamyar Nazeri et al. "Image Colorization with Generative Adversarial Networks" retrieved from arXiv:1803.05400v1 [cs.CV], Mar. 14, 2018, (17 pages total).
Augustus Odena et al. "Conditional Image Synthesis with Auxiliary Classifier GANs" In Proceedings of the 34th International Conference on Machine Learning, vol. 70, 2017, (10 pages total).
Taesung Park et al. "Semantic Image Synthesis with Spatially-Adaptive Normalization" retrieved from arXiv:1903.07291v1 [cs.CV], Mar. 18, 2019, (19 pages total).
Olaf Ronneberger et al. "U-Net: Convolutional Networks for Biomedical Image Segmentation" retrieved from arXiv:1505.04597v1 [cs.CV], May 18, 2015, (8 pages total).
T.-C. Wang et al. "pix2pixhd: High-resolution image synthesis and semantic manipulation with conditional GANs" NVDIA, 2017, (31 pages total).
T.-C. Wang et al. "pix2pixhd: High-resolution image synthesis and semantic manipulation with conditional GANs" NVDIA, 2018, (58 pages total).
Xintao Wang et al. "Esrgan: Enhanced super-resolution generative adversarial networks" In the European Conference on Computer Vision Workshops (ECCVW), Sep. 2018, (16 pages total).
Wenqi Xian et al. "TextureGAN: Controlling Deep Image Synthesis with Texture Patches" In Proceedings of the IEEE Conference on Computer Vision and Pattern Recognition, 2018, (10 pages total).
Zhi Zhang et al. "Bag of Freebies for Training Object Detection Neural Networks" retrieved from arXiv:1902.04103v1 [cs.CV], Feb. 11, 2019, (9 pages total).
Bolei Zhou et al. "Semantic Understanding of Scenes through the ADE20K Dataset" retrieved from arXiv: 1608.05442v1 [cs.CV], Aug. 18, 2016, (12 pages total).
Bolei Zhou et al. "Scene Parsing through ADE20K Dataset" In Proceedings of the IEEE Conference on Computer Vision and Pattern Recognition, 2017, (9 pages total).

(56) References Cited

OTHER PUBLICATIONS

Jun-Yan Zhu et al. "Unpaired Image-to-Image Translation using Cycle-Consistent Adversarial Networks" In Computer Vision (ICCV), 2017 IEEE International Conference, 2017, (10 pages total).

Andrew Brock et al. "Large scale GAN training for high fidelity natural image synthesis" retrieved from arXiv:1809.11096v1 [cs.LG], Sep. 28, 2018, (29 pages total).

Martin Heusel et al. "GANs Trained by a Two Time-Scale Update Rule Converge to a Local Nash Equilibrium" In Advances in Neural Information Processing Systems, 2017, (12 pages total).

Tim Salimans et al. "Improved Techniques for Training GANs" In Advances in neural information processing systems, 2016, (9 pages total).

Fisher Yu et al. "LSUN: Construction of a Large-scale Image Dataset using Deep Learning with Humans in the Loop" retrieved from arXiv: 1506.03365v2 [cs.CV], Jun. 19, 2015, (9 pages total).

Hengshuang Zhao et al. "Pyramid Scene Parsing Network" In Proceedings of the IEEE conference on computer vision and pattern recognition, 2017, (10 pages total).

Alec Radford et al. "Unsupervised representation learning with deep convolutional generative adversarial networks" retrieved from arXiv:1511.06434v2 [cs.LG], Jan. 7, 2016, (16 pages total).

Decision on Grant dated Sep. 3, 2020 issued by the Russian Patent Office for Russian Patent Application No. 2019140414.

Xun Huang et al. "Multimodal Unsupervised image-to-image translation" ECCV, 2018, (18 pages total).

Phillip Isola et al. "Image-to-Image Translation with Conditional Adversarial Networks" retrived from arXiv:1611.07004v1 [cs.CV], Nov. 21, 2016, (16 pages total).

Takeru Miyato et al. "cgans with projection discriminator" retrived from arXiv:1802.05637v2 [cs.LG], Aug. 15, 2018, (21 pages total).

Jun-Yan Zhu et al. "Unpaired Image-to-Image Translation using Cycle-Consistent Adversarial Networks" In Computer Vision (ICCV), 2017 IEEE International Conference, 2017, (10 pages total).

Andrew Brock et al. "Large sclae GAN training for high fidelity natural image synthesis" retrieved from arXiv:1809.11096v1 [cs.LG], Sep. 28, 2018, (29 pages total).

Wang, Wenguan et al., "Learning Unsupervised Video Object Segmentation through Visual Attention", IEEE/CVF Conference on Computer Vision and Pattern Recognition (CVPR), Jun. 16, 2019, pp. 3064-3074.

International Search Report (PCT/ISA/210) dated Jan. 8, 2021 by the International Searching Authority in counterpart International Patent Application No. PCT/KR2020/012463.

Written Opinion (PCT/ISA/237) dated Jan. 8, 2021 by the International Searching Authority in counterpart International Patent Application No. PCT/KR2020/012463.

Communication dated May 25, 2022 by the European Patent Office in counterpart European Patent Application No. 20866154.6.

Neff, Thomas et al., "Generative Adversarial Network based Synthesis for Supervised Medical Image Segmentation", Jan. 1, 2017, XP055920908. (7 pages total).

Huang, Hong et al., "Combing Triple-Part Features of Convolutional Neural Networks for Scene Classification in Remote Sensing", Remote Sensing, vol. 11, No. 14, Jul. 17, 2019, XP055920931. (23 pages total).

Anonymous, "Teaching GAN to generate per-pixel annotation", Open Review, Dec. 24, 2019, XP055920494. (4 pages total).

\* cited by examiner

TEACHING GAN (GENERATIVE ADVERSARIAL NETWORKS) TO GENERATE PER-PIXEL ANNOTATION

CROSS-REFERENCE TO RELATED APPLICATION(S)

This application is based on and claims priority under 35 U.S.C. § 119 to Russian Patent Application No. 2019129628, filed on Sep. 20, 2019, and Russian Patent Application No. 2019140414, filed on Dec. 9, 2019, in the Russian Federation Federal Service for Intellectual Property (ROSPATENT), and Korean Patent Application No. 10-2020-0034099, filed on Mar. 19, 2020, in the Korean Intellectual Property Office, the disclosures of which are incorporated by reference herein in their entireties.

BACKGROUND

1. Field

The disclosure relates to a method and apparatus for joint image and per-pixel annotation synthesis with a generative adversarial network (GAN).

2. Description of the Related Art

The quality of neural generative models has increased dramatically in recent years. The first Generative Adversarial Networks (GANs) could only generate Modified National Institute of Standards and Technology (MNIST) digits or low-resolution images. More recent models are able to generate images with high quality and resolution, that humans can often hardly distinguish from the real ones.

The task of image semantic segmentation, which is crucial in the field of scene understanding, has also obtained high-quality solutions with the appearance of modern neural network methods. Several works describe that these two approaches can be used together in one training scheme to generate a realistic image using a segmentation mask or for semi-supervised segmentation.

GANs usually consist of a generator network (or generator) and a discriminator network (or discriminator). The generator, trained to fool the discriminator, creates an image from random noise, and the discriminator is trained to distinguish real images and generated images. Iterative training of both networks makes the generator capable of creating images that are indistinguishable from the real ones. The main challenges faced by the machine learning community include high quality image generation, diverse image generation, and stable training.

The architecture of the first GAN was very simple, with both discriminator and generator consisting of only fully connected layers. This GAN was able to generate digits from the MNIST dataset or low resolution images from CIFAR-10, and struggled to generalize on more complex datasets. With the appearance of Deep Convolutional GAN (DC-GAN), the quality and diversity of image generation continued to improve by using both convolution and deconvolution layers. DCGAN allowed analysis of latent space demonstrating interpolation between images. As there is no explicit objective function for GANs, it is difficult to compare the performance of different models. Inception Score (IS) is one proposed method as an objective metric for evaluating the quality of generated images that correlates well with the subjective human evaluation. One shortcoming of IS is that it can misrepresent the performance if GAN generates only one image per class. Another related art objective metric for GANs, called Fr'echet Inception Distance (FID), has been proposed. FID is supposed to improve on IS by actually comparing the statistics of generated samples to real samples instead of evaluating generated samples only. Both FID and IS are commonly used for measuring the quality of generated samples. ProGAN has impressive results in generating high-quality images with up to 10242 resolution. The proposed progressive training strategy substantially stabilizes learning for both networks. BigGAN shows the state-of the-art results on ImageNet conditional generation. Other studies propose new losses, architectures and ways to incorporate the conditional information.

There are several works that propose ways for studying and manipulating internal GAN features. These include an analytic framework to visualize and understand GANs' properties at the unit-, object-, and scene-level, as well as an interface for exploring learned latent space of generative models and making specific semantic changes to natural images.

Semantic segmentation solves the task of classifying each image pixel by a given set of categories. With deep learning models evolving, the quality of semantic segmentation has improved significantly compared to methods relying on hand-crafted features.

The Fully Convolution Network (FCN) is the first architecture supporting end-to-end training for the task of image segmentation. The backbone network (AlexNet, VGG16) without fully-connected layers was adapted to accept arbitrary image sizes. Features obtained from images by backbone are then up-sampled either through bilinear interpolation or a series of transposed convolutions. U-Net architecture is an upgrade over FCN, with an encoder part extracting features from an image and a decoder part gradually up-sampling feature maps and forming a final prediction. The key invention of U-Net is skip-connections between corresponding blocks of decoder and encoder parts. This improves gradients flow to better aggregate information from multiple scales. Pyramid Scene Parsing Network (PSP-Net) introduces Pyramid Pooling Module (PPM) to explicitly incorporate information from multiple scales. This module performs the pooling operation on feature maps using different kernel sizes in parallel. Outputs of PPM are then up-sampled and concatenated to form feature maps containing both global and local context information. DeepLabV3 explores this idea and further replaces PPM with Atrous Spatial Pyramid Pooling (ASPP).

It applies atrous (dilated) convolutions with different dilation rates. DeepLabV3 replaces last convolution layers in an encoder backbone with atrous convolution to prevent significant loss in image size. DeepLabV3+ achieves state-of-the-art results on popular benchmarks. It upgrades DeepLabV3 by adding a simple yet effective decoder module to obtain sharper segmentation masks.

SUMMARY

Provided are a method and an apparatus for joint image and per-pixel annotation (segmentation masks) synthesis with GAN.

Additional aspects will be set forth in part in the description which follows and, in part, will be apparent from the description, or may be learned by practice of the presented embodiments.

In accordance with an aspect of the disclosure, a controlling method of an electronic apparatus includes: by inputting data to a generative adversarial network (GAN), obtaining a first image from the GAN; inputting, to a decoder, a first feature value that is obtained from at least one intermediate layer of the GAN according to the inputting of the data to the GAN; and obtaining a first semantic segmentation mask from the decoder according to the inputting of the first feature value to the decoder.

In accordance with another aspect of the disclosure, an electronic apparatus includes: a memory storing a decoder and a generative adversarial network (GAN) trained to generate an image based on input data; and at least one processor configured to: obtain a first image from the GAN by inputting data to the GAN, input, to the decoder, a first feature value that is obtained from at least one intermediate layer of the GAN according to the inputting of the data to the GAN, and obtain a first semantic segmentation mask from the decoder according to the input of the first feature value to the decoder.

In accordance with another aspect of the disclosure, a non-transitory computer readable medium has stored therein a computer instruction executable by at least one processor of an electronic apparatus to perform a method including: inputting data to a generative adversarial network (GAN) to obtain a first image from the GAN; inputting, to a decoder, a first feature value that is obtained from at least one intermediate layer of the GAN according to the inputting of the data to the GAN; and obtaining a first semantic segmentation mask from the decoder according to the inputting of the first feature value to the decoder.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Provided is a method for joint image and per-pixel annotation (segmentation masks) synthesis with GAN. GAN has good high-level representation of target data that can be easily projected to semantic segmentation masks. This method can be used to create a training dataset for teaching a separate semantic segmentation network. Experiments show that such a segmentation network successfully generalizes on real data. Additionally, the method outperforms supervised training when the number of training samples is small, and works on a variety of different scenes and classes.

Embodiments can be implemented in software, hardware, or a combination thereof for obtaining images on a screen.

One or more embodiments jointly generate data and the corresponding synthetic markup using generative-competitive networks, which requires a small number of examples of markup by a person. It is proposed to use this markup to train a particular neuron of the network.

Embodiments allow to achieve the same quality of deep learning algorithms with fewer human-annotated samples.

Further, in accordance with embodiments, a separate semantic segmentation network trained on a synthetic dataset generalizes on real images. Also, methods according to one or more embodiments outperform regular supervised training when the number of annotated images is small.

The various operations to be described below can be performed by at least one electronic device.

Figure 1:
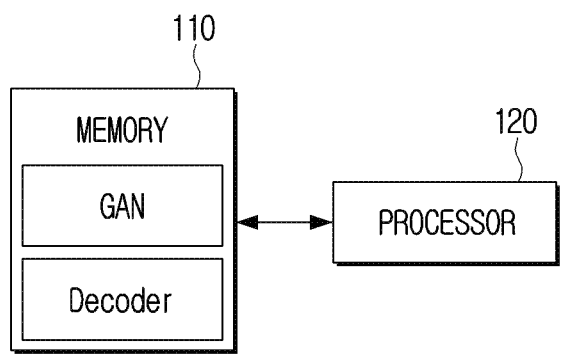
FIG. 1 is a block diagram illustrating a configuration of an electronic apparatus according to an embodiment.

FIG. 1 is a diagram illustrating a configuration of an electronic apparatus 100 according to an embodiment. Referring to FIG. 1, an electronic apparatus 100 may include a memory 110 and a processor 120 (e.g., at least one processor).

The electronic apparatus 100 may be implemented as various devices such as a desktop personal computer (PC), a notebook PC, a tablet PC, a smartphone, a server device, or the like.

The memory 110 may store information related to various functions or instructions of the electronic apparatus 100. The memory 110 may include a read only memory (ROM), a random access memory (RAM), a hard disc drive, a solid state drive (SSD), a flash memory, or the like.

The memory 110 may store one or more artificial intelligence (AI) models. The AI model may include a plurality of neural network layers. Each layer has a plurality of weight values, and performs a layer operation through a result of a calculation of a previous layer and an operation of a plurality of weights. The plurality of weights of the plurality of neural network layers may be optimized by a learning (or training) result of the AI model.

Referring to FIG. 1, the memory 110 may include generative adversarial networks (GAN), a decoder, or the like.

The processor 120 is configured to perform various methods or operations described below. A function of the AI model stored in the memory 110 may be performed by the processor 120 and the memory 110.

The processor 120 may be configured with one or more processors. The one or more processors may include at least one of a general purpose processor, such as a central processing unit (CPU), an application processor (AP), or the like, a graphics-only or graphics-dedicated processor such as a graphics processing unit (GPU), a vision processing unit (VPU), etc., or an AI-only or AI-dedicated processor such as a neural processing unit (NPU).

The one or more processors control the processing of the input data according to a predefined operating rule or an AI model stored in the memory 110. Alternatively, if the one or more processors include an AI-only or AI-dedicated processor, the AI-only or AI-dedicated processor may be designed with a hardware structure specialized for processing a specific AI model.

The electronic apparatus 100 may further include a display to display an image and a semantic segmentation mask for the image. Alternatively, the electronic apparatus 100 may further include a communicator or an interface to transmit the image and data for the semantic segmentation mask to an external device.

The memory 110 may store a GAN model that is trained on a given dataset. The GAN model is trained to generate images with characteristics similar to ones from a target dataset. Further, pre-trained models may be used, such as StyleGAN (see, e.g., Jonathan Long, Evan Shelhamer, and Trevor Darrell. Fully convolutional networks for semantic segmentation. In Proceedings of the IEEE conference on computer vision and pattern recognition, pages 3431-3440, 2015; incorporated herein in its entirety by reference). GAN takes a random vector as an input and outputs an image.

According to one or more embodiments, a light-weight decoder is added to this GAN. Here, the decoder may be stored in the memory 110.

The decoder may be considered light-weight because the decoder has a much smaller number of parameters than the GAN.

The decoder is trained to generate a per-pixel annotation for the image that is generated by the GAN. To train the decoder, several images are generated by the GAN and manually annotated by a human annotator. According to the image generated by the GAN, a human draws a pixel mask of the object of interest. The annotation is denoted as a segmentation mask or a pixel map.

The decoder is trained in a supervised manner using masks from the previous step with corresponding intermediate GAN features. As in most semantic segmentation studies, cross-entropy between the predicted mask and ground truth is minimized. During training, GAN remains fixed to reduce computational cost. Only a few images may be used in order to train the decoder due to its light-weight nature. A modified network (including GAN and decoder) is then used to generate a large dataset of images together with annotation.

A generated synthetic dataset consists of pairs of images and predicted segmentation masks that can be treated as ground truth. Thus, this dataset can be used to train a segmentation network in, by way of example, a supervised manner.

For purposes of comparison in this disclosure, StyleGAN is used as a baseline image generation method and Deep-LabV3+ as a baseline image segmentation method.

According to an embodiment, a hardware comprising software products is provided to perform a method for joint image and per-pixel annotation synthesis with GAN. The hardware may correspond to the electronic apparatus 100 described above, and at least a part of the software may be stored in the memory 110 and executed by the processor 120, although it is understood that one or more other embodiments are not limited thereto.

Figure 2:
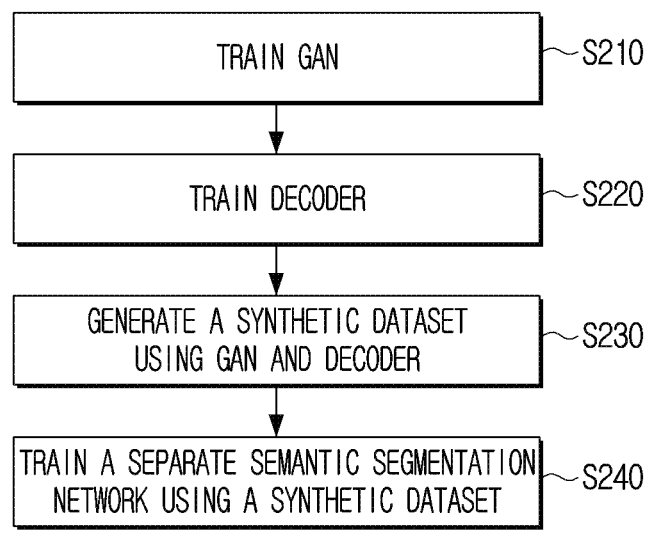
FIG. 2 is a flowchart illustrating an image synthesis method and an annotation synthesis method according to an embodiment.

FIG. 2 is a flowchart illustrating an image synthesis method and an annotation synthesis method according to an embodiment.

Referring to FIG. 2, GAN may be pretrained in operation S210. To be specific, a GAN model may be pretrained via an unlabeled target dataset. The GAN is a mapping from a random vector to an image from the target dataset distribution (e.g., StyleGAN, DCGAN, BigGAN, etc.). The pretrained GAN model may be extended by adding a decoder network.

This network maps features of inner layers of the GAN model to a semantic segmentation mask corresponding to an image, generated by the GAN from the same features.

In this process, annotating few samples generated by the GAN with semantic segmentation masks by a human may be performed.

The method may include an operation (S220) of training a decoder based on a semantic segmentation mask for a respective image and the respective image. Here, training the decoder on the pairs of input features and corresponding annotated masks may be performed in a supervised manner. The GAN model remains fixed during training.

The synthetic dataset may be generated using the trained GAN and the trained decoder in operation S230. To be specific, generating a large synthetic dataset from the GAN and the decoder may be performed by applying these models to random vectors. The synthetic dataset may include an image generated by GAN and annotation (e.g., semantic segmentation mask) by pixels obtained by the decoder associated with the generated image.

A separate semantic segmentation network may be trained based on the generated synthetic dataset in operation S240. Training a separate semantic segmentation network on generated synthetic dataset may be performed in a supervised manner. The trained semantic segmentation network may generate annotations (e.g., semantic segmentation mask) associated with the input image.

As a result, it is possible to create a synthetic dataset that can be used for training a segmentation network using only a few human-annotated semantic segmentation masks. Usually, in the related art, thousands of human-annotated masks are required.

Figure 3:
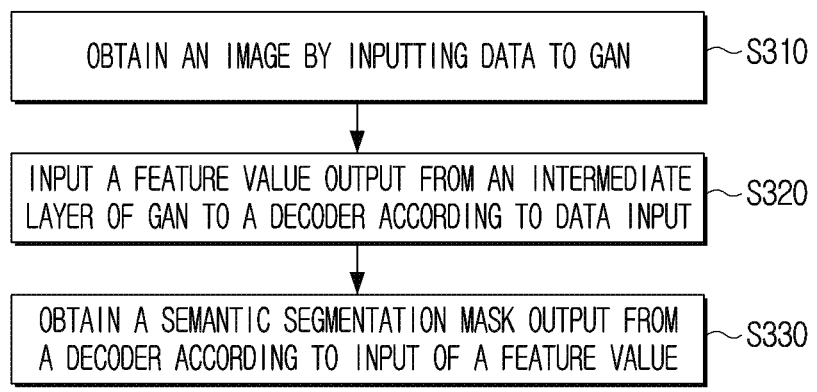
FIG. 3 is a flowchart illustrating an example of generating synthetic data using a GAN and a decoder.

FIG. 3 is a flowchart illustrating operation S230 in greater detail. The operations of FIG. 3 may be performed by the electronic apparatus 100 including the decoder and the GAN.

Referring to FIG. 3, by inputting the data to the GAN, the image output from the GAN may be obtained in operation S310.

A feature value output from at least one intermediate layer may be input according to data input in operation S320.

A semantic segmentation mask output from the decoder may be obtained according to input of the feature value in operation S330. The semantic segmentation mask output from the decoder corresponds to the image of S310.

An algorithm for semantic segmentation, which is taken as the base, is disclosed. The current algorithm is compared with the basic one for accuracy with a different number of training examples.

As compared to the related art, a synthetic image generation apparatus and method according to one or more embodiments implement an algorithm for joint data generation and associated markup annotation, and provide an ability to train deep learning models for semantic segmentation with fewer annotated data and an ability to learn from the data generated by the GAN, while the model is successfully generalized to real data.

An application according to an embodiment accelerates interactive annotation for segmentation on a user dataset. This means that less human-annotated semantic segmentation masks are needed to train a competitive segmentation model, that works well on random images from the web. In the related art, hundreds or thousands of annotated semantic segmentation masks are required to achieve the same accuracy.

A method according to an embodiment modifies a previously trained GAN model by adding an extra light-weight semantic segmentation network (e.g., decoder). The architecture of this network and proposed joint image and per-pixel annotation synthesis method is described below.

GAN pre-training: Pretrain GAN model on unlabeled target dataset (experiments on several datasets including FFHQ, LSUN-interiors, and LSUN-cars, are described below).

Figure 4A:
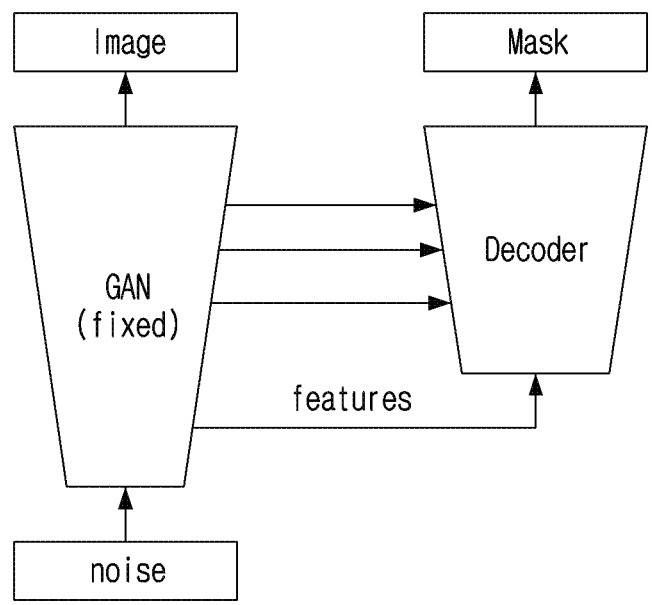
FIG. 4A is a block diagram schematically illustrating a network architecture according to an embodiment.

Referring to FIG. 4A, the GAN is trained to generate an image from an arbitrary noise.

The first step is to train the GAN model to generate images of a given dataset from random vectors. GAN training is a time- and resource-consuming process. According to an embodiment, a pre-trained GAN model (e.g., StyleGAN) may be used, although one or more other embodiments are not limited thereto.

Decoder building (graph assignment): A decoder is configured to generate an annotation (e.g., semantic segmentation mask) associated with the corresponding image based on the input feature value(s) and the image (see FIG. 4B).

Figure 4B:
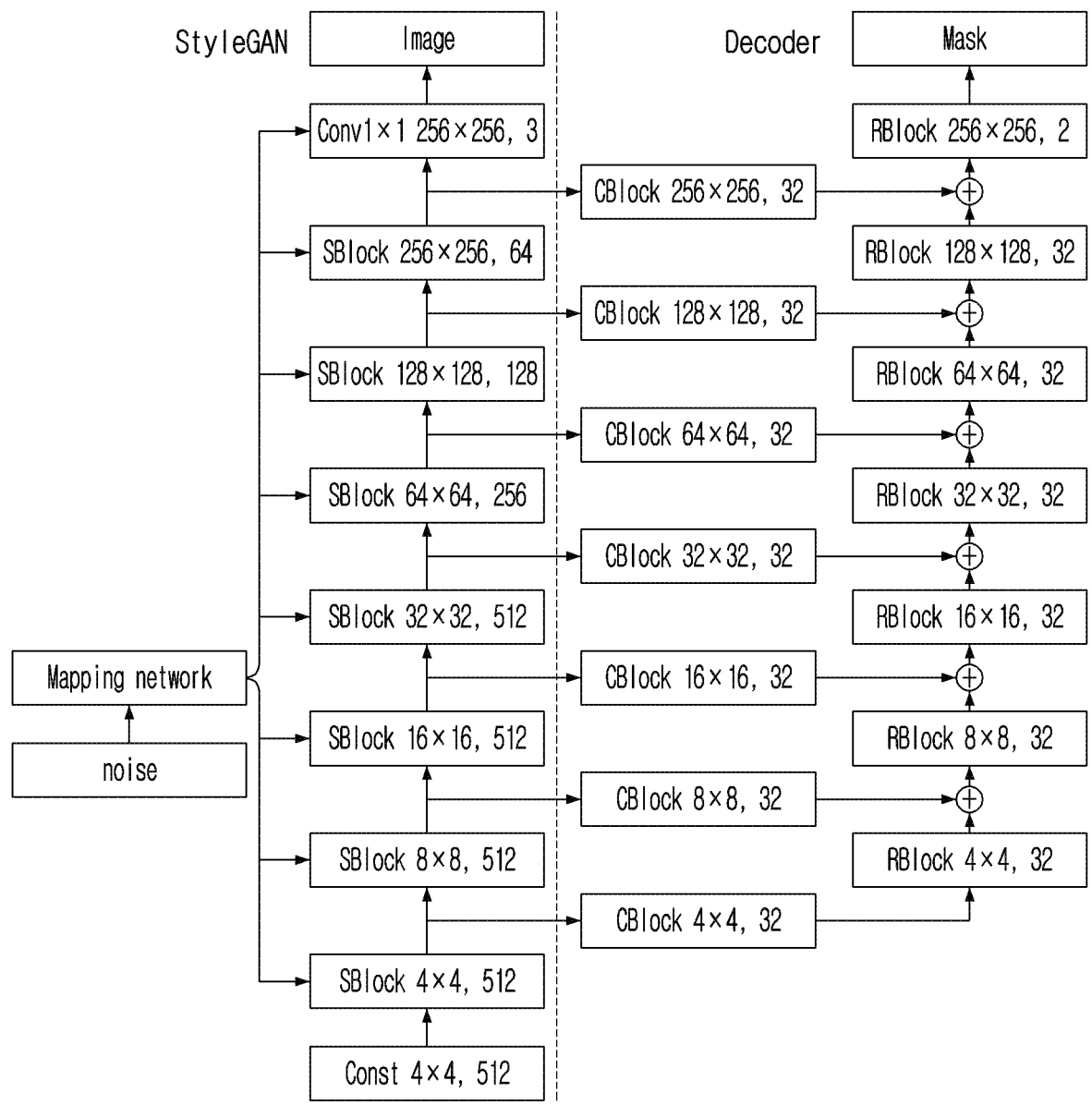
FIG. 4B is a block diagram illustrating a network architecture, according to an embodiment, in greater detail.

A decoder architecture according to an embodiment is shown in FIG. 4B. The decoder architecture maps the outputs of intermediate GAN layers to the semantic segmentation mask. A mapping network consists of 8 fully-connected layers and each SBlock has an up-sampling layer, two convolutions and two AdaINs. Each CBlock of the decoder accepts the features from a corresponding SBlock of StyleGAN as an input. CBlock consists of a dropout, a convolution and a batch normalization layer. This block maps features from StyleGAN to the decoder reducing their dimensionality.

In the present example, the probability rate of all dropout layers is set to 50%. Each RBlock of the decoder has one residual block with two convolution layers. The number of feature maps for each convolution layer of the decoder is set to 32, as initial experiments have shown that increasing the number of feature maps does not increase the quality.

Annotating of a few synthetic images: For further training of the built decoder, a small sample of synthetic images are manually annotated. For each picture from the small sample, the user may specify the mask of the object of interest by drawing it with a computer mouse. Images are generated by mapping a random vector from normal distribution by the GAN, and intermediate features are stored for further training.

Decoder training: The decoder is trained in a supervised manner using masks from the previous step with corresponding intermediate GAN features. As in most semantic segmentation studies, cross-entropy between the predicted mask and ground truth is minimized. During training, the GAN remains fixed to reduce computational cost.

Generating large synthetic dataset: After the decoder is trained, an arbitrary number of synthetic images is generated with corresponding segmentation masks in the following way. A random vector is sampled from normal distribution and fed as an input of the GAN, which maps it to a synthetic image. The outputs of the required generator's blocks are fed to the decoder as described above. Finally, the decoder generates a segmentation mask corresponding to the proposed synthetic image.

Segmentation network training: The generated synthetic dataset consists of pairs of images and predicted segmentation masks that can be treated as ground truth. Thus, this dataset can be used to train a segmentation network in a supervised manner.

Training Decoder

Figure 5:
FIG. 5 is an example of a generated image from Style-GAN-FFHQ and a corresponding generated annotation for hair segmentation.

As shown in FIG. 5, the decoder is trained for joint image 1 and semantic segmentation mask 2 synthesis. As shown in FIGS. 4A and 4B, decoder accepts features from GAN and outputs a segmentation mask.

The decoder is trained in a supervised manner on the pairs of input features and corresponding masks. In particular, during the training procedure, cross-entropy loss is minimized through back-propagation. Such pairs can be collected simply by annotating generated images and storing corresponding intermediate features from the GAN. Note that the original GAN remains fixed (frozen). Intermediate features are taken after each block of StyleGAN before upsampling as shown in FIG. 4B.

Since training time is proporiate to the number of trainable parameters, the weights of GAN remains fixed (frozen) to reduce computational cost. Training may only take a few minutes and the decoder successfully learns based on a small number of training examples. Training examples are selected randomly from generated images.

A scheme of the decoder with the original StyleGAN is shown in FIG. 4B. StyleGAN takes a random vector from a normal distribution (normal distribution is a type of continuous probability distribution for a real-valued random variable) as input and outputs an image. The decoder takes features from StyleGAN as inputs and outputs a mask. Features are taken after each block of StyleGAN.

Training Segmentation Network on Synthetic Data

After the decoder is trained, a large dataset of pairs of GAN-generated images and corresponding masks predicted by the decoder is created. Training is done with DeepLabV3+ on this synthetic dataset. Experiments show that such a network successfully generalizes on real data.

Finding Segmentation Mask without Training a Segmentation Network

According to another embodiment, the segmentation model training pipeline includes a separate neural network in the last step so as to find a segmentation mask without training a segmentation network. In other words, as compared to the above-described embodiment, the present embodiment does not include the generation of a large synthetic dataset and the training of a separate segmentation network in the training pipeline. Both the decoder and the segmentation model give out a segmentation mask as the output, but one takes the set of intermediate features of the GAN as an input, and the second takes an image itself. To conduct an experiment in such a formulation, a mapping is constructed from an arbitrary image into the space of intermediate features of GAN. By inputting the obtained vectors to this generator, a set of intermediate features for the corresponding image is obtained, from which a segmentation mask using the proposed pre-trained decoder is obtained.

Figure 8:
FIG. 8 illustrates a StyleGAN and a predicted mask, wherein a separate segmentation network is not trained.

One of the results is shown in FIG. 8. The left image in FIG. 8 is an arbitrary photo, the middle image is its view after sequential use of Image2StyleGAN and StyleGAN generator, and the right image is a segmentation mask generated by the decoder according to the present embodiment.

Figure 9:
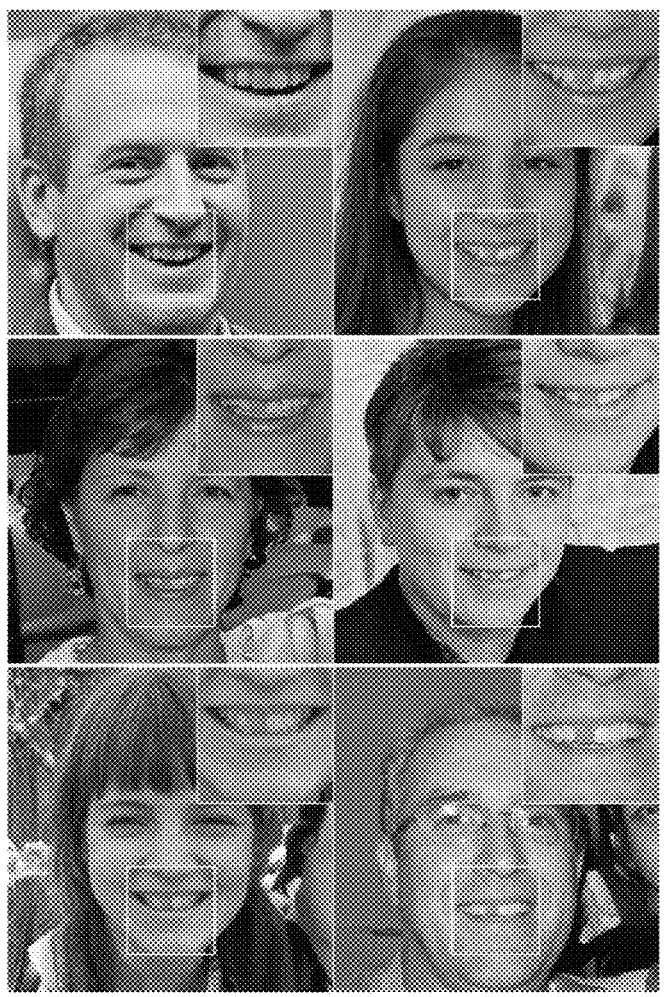
FIG. 9 illustrates synthetic images from StyleGAN trained on FFHQ dataset and the proposed segmentation masks of a front right tooth.

The present model's ability to generalize can be used with respect to a very specific part of the face. This can be demonstrated via an example experimentation of labeling only the right front tooth of the upper jaw. Although more than 10 teeth can be seen on a human face photo, the proposed method demonstrates almost perfect results while using only 5 annotated synthetic images as shown in FIG. 9 (only 5 synthetic images are annotated for training. Note that proposed model expectedly segments only one of the several equally textured teeth).

The example experiments are described sequentially below.

Experiments

LSUN-Cars. (LSUN: Construction of a Large-Scale Image Dataset Using Deep Learning with Humans in the Loop)

In a first experiment, a subset of 100 images from validation part of LSUN-cars were sampled and annotated with masks of cars. Then the dataset was randomly split to train and test parts, with 20 samples used for training and 80 samples for testing. For the baseline method, the 20 training samples were used to train DeepLabV3+. For the method according to an embodiment, 20 random images generated by StyleGAN were also annotated and used to train a decoder. Then, 10000 synthetic samples were generated and used to train DeepLabV3+. Both methods were tested on 80 real samples. The results of evaluation are shown in Table 1 below.

Examples of the results are shown in FIGS.>6A to 6D. FIGS. 6A to 6D illustrate a comparison of the method according to an embodiment to a baseline on LSUN-interiors for a varying number of training samples.

Figure 6A:
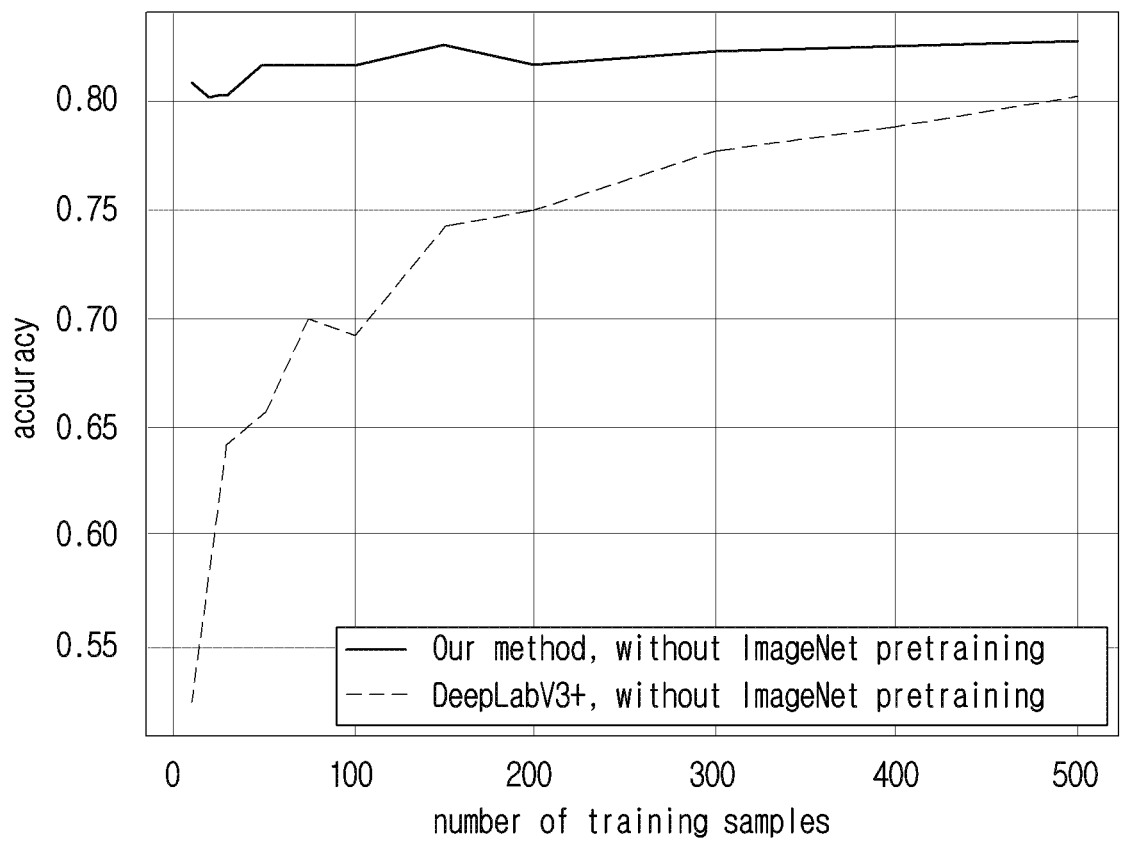
FIGS. 6A to 6D each illustrate a comparison of a proposed method to a baseline on LSUN-interiors for a varying number of training samples.
Figure 6B:
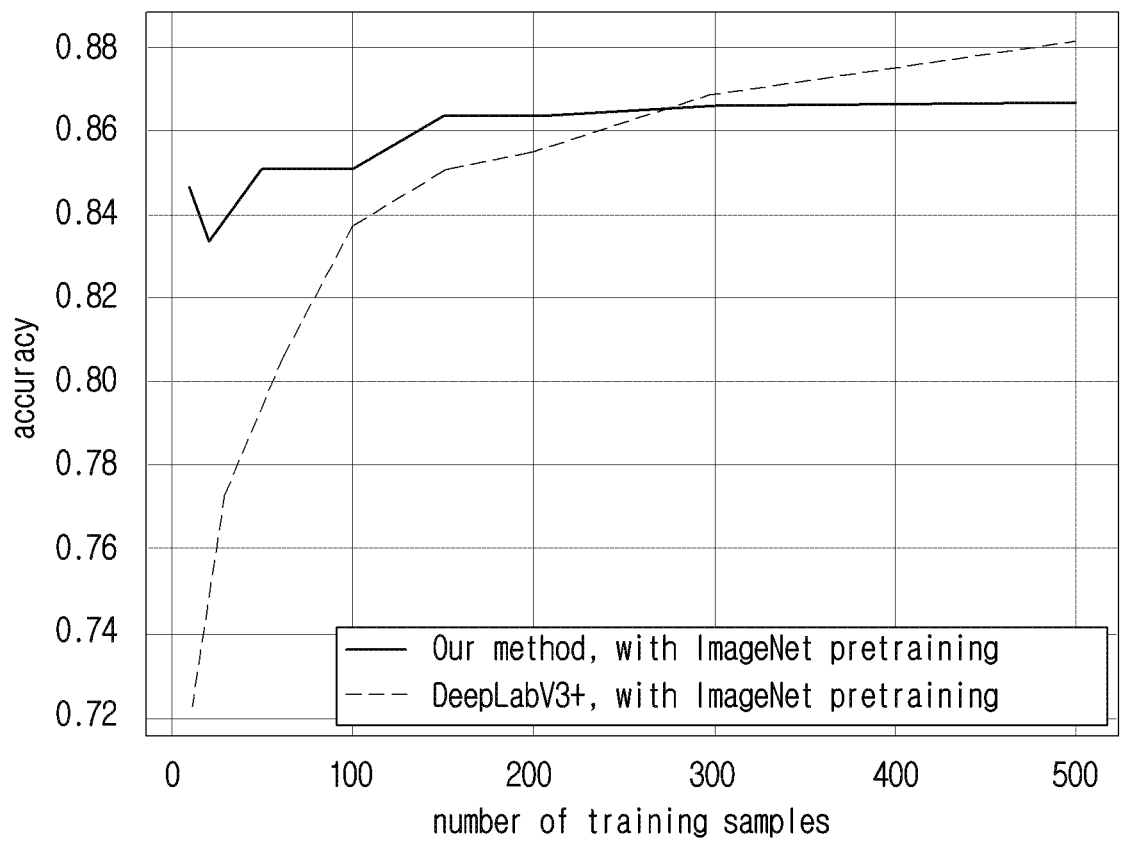
Figure 6C:
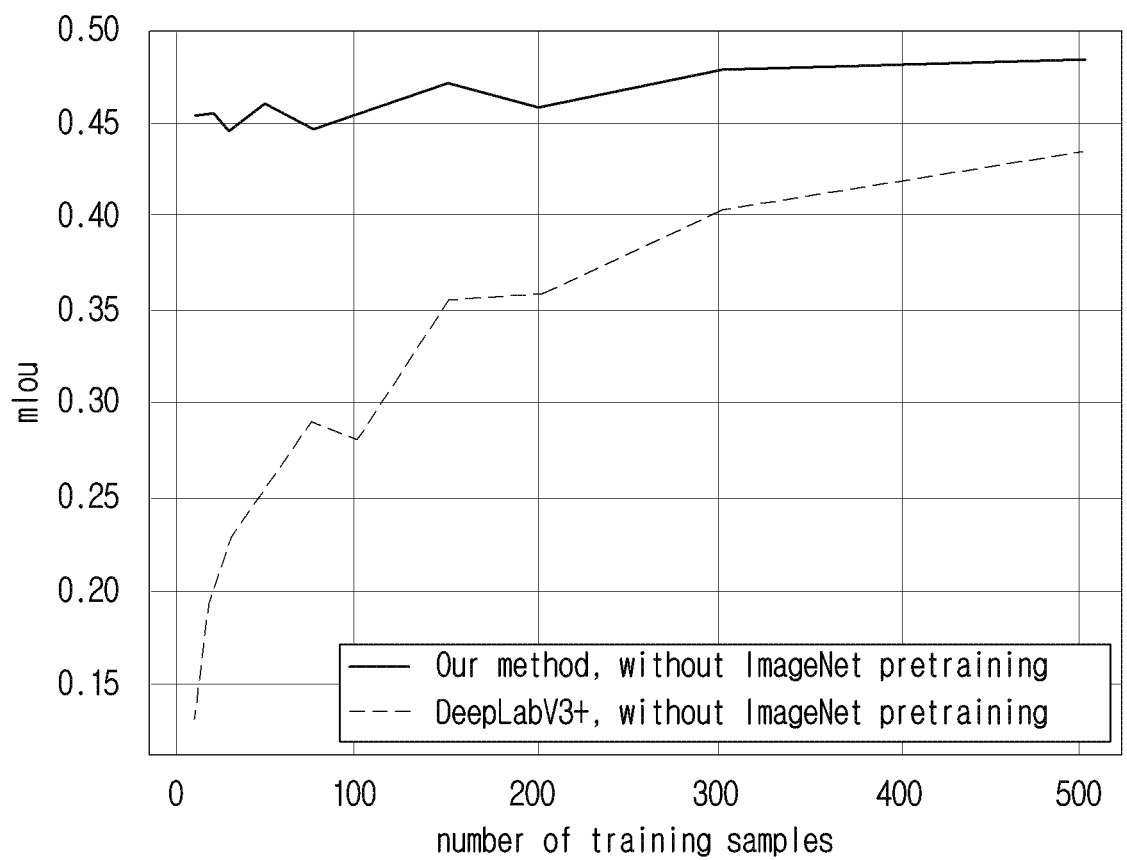
Figure 6D:
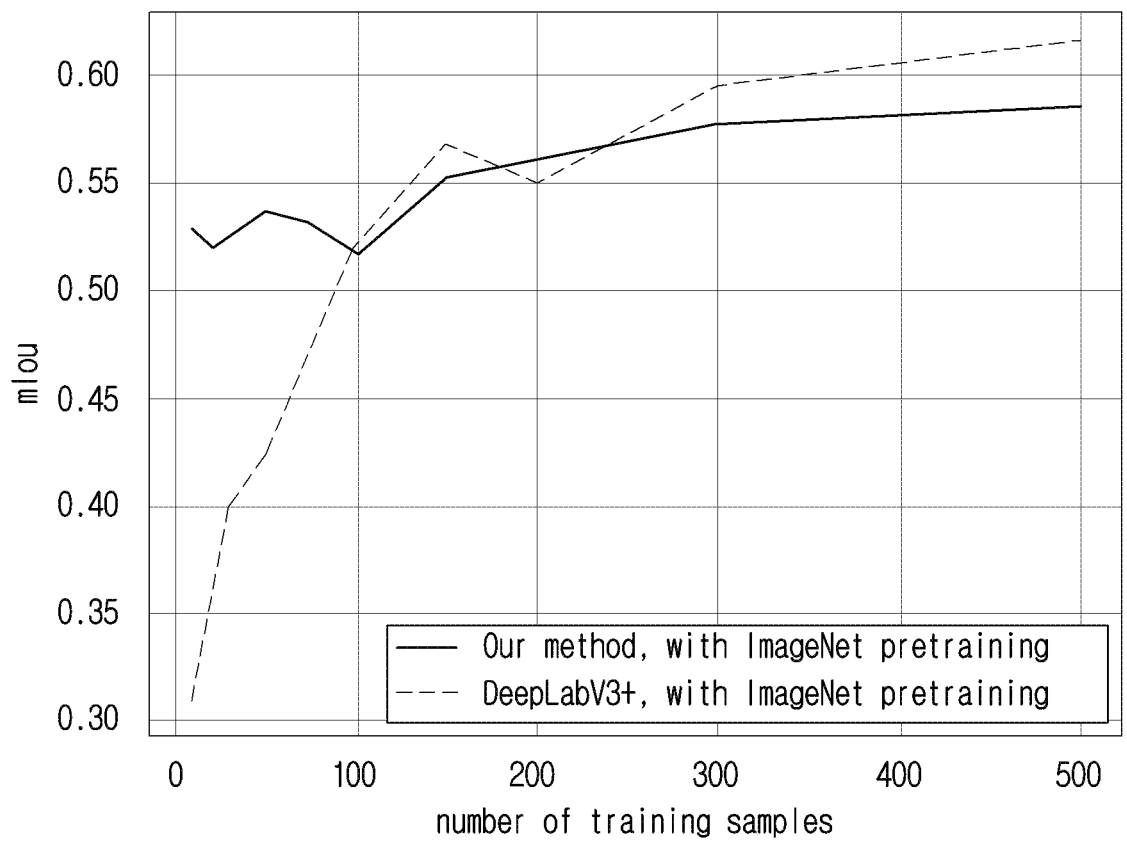

FIG. 6A: upper curve is the method according to an embodiment without imageNet pretraining; bottom curve is DeepLabV3+, without ImageNet pretraining—without ImageNet; pretrained backbone, accuracy;

FIG. 6B: with ImageNet pretrained backbone, accuracy;

FIG. 6C: without ImageNet pretrained backbone, mean-IoU;

FIG. 6D: with ImageNet pretrained backbone, mean IoU.

Accuracy and Intersection-Over-Union (IoU) are used as evaluation metrics to compare the baseline method with the method according to an embodiment. Both methods were evaluated on 80 test images. Referring to FIGS. 6A to 6D, the method according to an embodiment may have a greater margin than a baseline method when the number of training samples is small.

The results are shown in Table 1. The method according to an embodiment results in an increase of 2% increase in accuracy and 5% in IoU compared to the baseline.

Table 1 also shows a comparison of the approach according to an embodiment with the baseline in case of training neural networks from scratch, i.e., without using the backbone pre-trained on ImageNet. In this experiment, only 20 annotated images were involved in training, compared to the additional million images from ImageNet with multi-class semantic segmentation masks in the experiment with a pre-trained backbone. In this case, the increase in accuracy compared to the baseline becomes even larger (namely more than 10% in accuracy and 20% in IoU).

Figure 7:
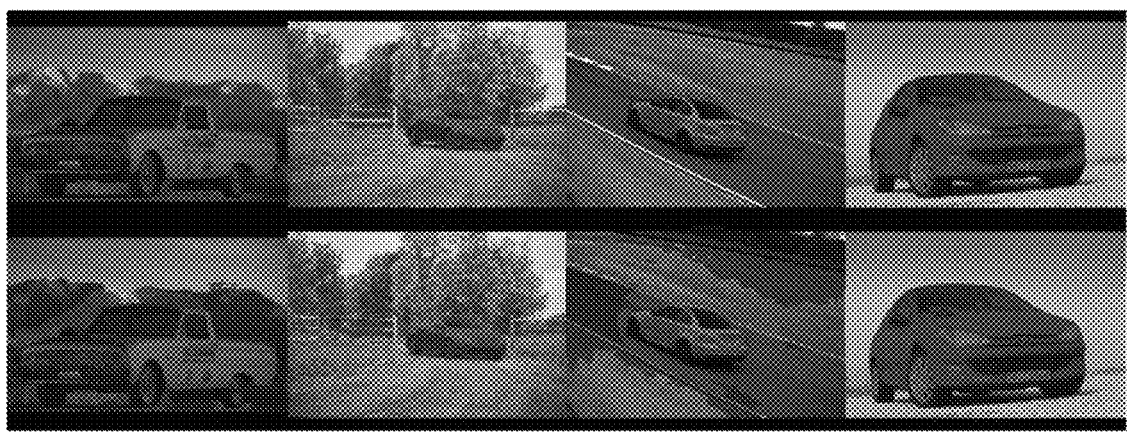
FIG. 7 illustrates segmentation masks for cars from LSUN dataset.

Visualization of the results is shown in FIG. 7. The top row masks obtained by the method according to an embodiment are more accurate than the bottom row masks of the baseline method.

TABLE 1

Evaluation results on LSUN-cars dataset with two classes (background and car)

| Method | pre-trained backbone | accuracy | IoU |
| --- | --- | --- | --- |
| DeepLab V3+ (Chen et al., 2018) | — | 0.8588 | 0.6983 |
| Proposed method (ours) | — | 0.9787 | 0.9408 |
| DeepLab V3+ (Chen et al., 2018) | ImageNet | 0.9641 | 0.9049 |
| Proposed method (ours) | ImageNet | 0.9862 | 0.9609 |

For the car segmentation task, the LSUN dataset with a pre-trained StyleGAN model is used. LSUN is a million scale image classification dataset with 10 scene categories and 20 object categories (see, e.g., Fisher Yu, Yinda Zhang, Shuran Song, Ari Seff, and Jianxiong Xiao. Lsun: Construction of a large-scale image dataset using deep learning with humans in the loop. arXiv preprint arXiv:1506.03365, 2015; incorporated herein in its entirety by reference). Only images related to the cars category were selected. Further, 100 images of size 512×384 pixels were annotated with segmentation masks of cars. From these images, 20 samples were used for training the baseline DeepLabV3+ model and the other 80 for evaluating both the method according to an embodiment and the baseline. Then the whole training pipeline was run, including generating 10,000 synthetic images on the dataset generation step and manually annotating 20 of them. Both methods were evaluated on 80 test images. The results are shown above in Table 1. The method according to an embodiment results in an increase of 2% increase in accuracy and 5% in IoU compared to the baseline.

As set forth above, Table 1 also shows a comparison of the approach according to an embodiment with the baseline in case of training neural networks from scratch, i.e., without using the backbone pre-trained on ImageNet. In this experiment, only 20 annotated images were involved in training, compared to the additional million images from ImageNet with multi-class semantic segmentation masks in the experiment with a pre-trained backbone. In this case, the increase in accuracy compared to the baseline becomes even larger (namely more than 10% in accuracy and 20% in IoU).

Also demonstrated is obtained segmentation masks for 4 images from the test subset in FIG. 7 to confirm the difference in quality between the proposed method and the baseline. FIG. 7 illustrates segmentation masks for cars from the LSUN dataset. The top row corresponds to the method according to an embodiment, while the bottom row corresponds to DeepLabV3+. Training was performed on 20 annotated images for both methods.

Evaluation Protocol.

Two variants of the backbone were tested for DeepLabV3+: pretrained on ImageNet and not pretrained. Pixel accuracy was measured and Intersection-Over-Union averaged across the classes (mIoU). ImageNet is a large-scale dataset with 1 million human-annotated images from 1000 classes. Thus, such methods imply the implicit use of classification annotation in addition to segmentation annotation. Experiments were conducted to compare the method according to an embodiment with the baseline in two setups: with and without the ImageNet pretrained backbone.

The same experiments were conducted on the Flickr-Faces-HQ (FFHQ) dataset. FFHQ is a high-quality image dataset of human faces, originally created as a benchmark for generative adversarial networks (GAN). The dataset consists of 70,000 high-quality PNG images at 1024×1024 resolution and contains considerable variation in terms of age, ethnicity and image background. It also has good coverage of accessories such as eyeglasses, sunglasses, hats, etc. For demonstrating the method according to an embodiment on this dataset, hair segmentation was used as a target task. Inventors used 20 human-annotated images for training and 80 human-annotated images for testing.

The results are shown in Table 2 (pixel accuracy and Intersection-Over-Union averaged across the classes (see Evaluation protocol), which are dimensionless quantities).

As can be seen, the method according to an embodiment outperforms the baseline DeepLabV3 model by 7% in IoU and 1% in accuracy.

Image2StyleGAN for StyleGAN-FFHQ was also experimented with. An example of embedding and mask is shown in FIG. 8. An example of a real photo is provided on the left of FIG. 8. The Image2StyleGAN algorithm was then applied to find its representation in the embedding space. A reconstructed image from this embedding is depicted in the center of FIG. 8. Finally, the trained decoder according to an embodiment was applied to features of this reconstructed image to obtain a hair segmentation mask. This mask is shown on the right of FIG. 8.

TABLE 2

Evaluation results on FFHQ dataset with two classes (background and hair)

| Method | pre-trained backbone | accuracy | IoU |
|---|---|---|---|
| DeepLab V3+ (Chen et al., 2018) | ImageNet | 0.8831 | 0.7549 |
| Proposed method (ours) | ImageNet | 0.8967 | 0.8243 |

LSUN-interiors is a subset of the LSUN dataset which contains photos of interior interiors. In this experiment, the method according to an embodiment is compared to the baseline for a varying number of training samples to see the dynamics. As there is no semantic segmentation masks for LSUN-interiors and annotation is quite tedious, a segmentation network from the GluonCV package pretrained on ADE20K was used to create an annotation. The experiment used only 13 classes out of 150 of ADE20K that correspond to interiors scenes. Results are shown in FIGS. 6A to 6D.

The comparison of the method according to an embodiment to the baseline in different settings is shown on four plots. Inventors compare IoU and accuracy metrics for a varying number of training samples. Accuracy is compared in FIG. 6A and FIG. 6B, mIoU in FIG. 6C and FIG. 6D. The ImageNet-pretrained backbone was used for experiments depicted in FIGS. 6A and 6C. Meanwhile, the segmentation network was trained from scratch for experiments depicted in FIGS. 6B and 6D. The experiments show that the method according to an embodiment works well when the number of training samples is small and outperforms the baseline by a large margin in this case.

Implementation Details.

The MXNet Gluon framework was used to implement the proposed algorithm (see, e.g., Tianqi Chen, Mu Li, Yutian Li, Min Lin, Naiyan Wang, Minjie Wang, Tianjun Xiao, Bing Xu, Chiyuan Zhang, and Zheng Zhang. Mxnet: A flexible and efficient machine learning library for heterogeneous distributed systems. arXiv preprint arXiv:1512.01274, 2015; incorporated by reference herein in its entirety). Since StyleGAN training is time-consuming, models pre-trained by authors of the original work were used in all experiments, and converted into a format accepted by MXNet Gluon. To train the decoder, the Adam optimizer is used and its initial learning rate set to $1 \times 10^{-4}$. While training original DeepLabV3+, different training parameters were used. In particular, the SGD optimizer was used and its momentum set to 0.9, initial learning rate to 0.01, and weight decay to $1 \times 10^{-4}$. Additionally, ResNet-50 was set as a backbone for DeepLabV3+, and was pre-trained on ImageNet unless otherwise stated. In all experiments, pixel accuracy and Intersection-Over-Union averaged across the classes (IoU) were used to evaluate the quality.

Experiments show that proposed method works well, particularly when the number of training samples is small and outperforms regular supervised training by a large margin in this case.

A method and system according to one or more embodiments generate images along with semantic segmentation masks using a pretrained GAN. The pretrained GAN can be used for training a separate segmentation network. The experiments as described above show that such a segmentation network successfully generalizes on real data.

The foregoing embodiments are examples and are not to be construed as limiting. In addition, the description of embodiments is intended to be illustrative, and not to limit the scope of the claims, and many alternatives, modifications, and variations will be apparent to those skilled in the art.

Various embodiments described above may be implemented in a recordable medium that is readable by a computer or a device similar to a computer using software, hardware, or the combination of software and hardware.

By hardware implementation, embodiments may be implemented using, for example, and without limitation, at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electric units for performing other functions, or the like.

In some cases, embodiments described herein may be implemented by the processor 120 itself. According to a software implementation, embodiments such as the procedures and functions described herein may be implemented with separate software modules. Each of the above-described software modules may perform one or more of the functions and operations described herein.

The computer instructions for performing the processing operations of the electronic apparatus 100 according to various embodiments described above may be stored in a non-transitory computer-readable medium. The computer instructions stored in this non-transitory computer-readable medium may cause the above-described specific device to perform the processing operations in the electronic apparatus 100 according to the above-described various embodiments when executed by a processor of a specific device.

The non-transitory computer readable medium may refer, for example, to a medium that stores data semi-permanently, and is readable by an apparatus. For example, the aforementioned various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like.

The foregoing descriptions of embodiments are illustrative, and modifications to the configurations and implementations are possible within the scope of the disclosure. Embodiments shown throughout the above figures are by way of example only.

Although embodiments of the disclosure have been described as operations of structural features or methods, the subject matter defined in the claims is not necessarily limited to the features and operations described above. Rather, the structural features and operations described above are merely examples for introducing the claims.

An order of each of the operations in the methods according to the disclosure is not limited to the examples described above. The order can be modified by a person skilled in the art without any particular effort within the obvious range. At least some of the steps belonging to each method may be performed sequentially or simultaneously. A specific step may be omitted. The technical spirit may be limited only by the following claims.

The invention claimed is:

1. A controlling method of an electronic apparatus, the method comprising:
by inputting data to a generative adversarial network (GAN), obtaining a first image from the GAN;
inputting, to a decoder, a first feature value that is obtained from at least one intermediate layer of the GAN according to the inputting of the data to the GAN; and
obtaining a first semantic segmentation mask from the decoder according to the inputting of the first feature value to the decoder,
wherein the obtaining the first semantic segmentation mask comprises obtaining the first semantic segmentation mask corresponding to the first image from the decoder according to the inputting of the first feature value.

2. The method of claim 1, further comprising:
based on a second feature value that is obtained from the at least one intermediate layer of the GAN and a second semantic segmentation mask that is added to a second image output from the GAN, training the decoder to output a semantic segmentation mask based on a feature value obtained from the at least one intermediate layer of the GAN being input to the decoder,
wherein the inputting the first feature value comprises inputting the first feature value to the trained decoder.

3. The method of claim 1, further comprising displaying the first image and the first segmentation mask.

4. The method of claim 1, wherein the decoder is a light-weight decoder that has a smaller number of parameters than the GAN.

5. A controlling method of an electronic apparatus, the method comprising:
by inputting data to a generative adversarial network (GAN), obtaining a first image from the GAN;
inputting, to a decoder, a first feature value that is obtained from at least one intermediate layer of the GAN according to the inputting of the data to the GAN;
obtaining a first semantic segmentation mask from the decoder according to the inputting of the first feature value to the decoder; and
based on the first image obtained from the GAN and the first semantic segmentation mask obtained from the decoder, training a semantic segmentation network to, based on a third image being input the semantic segmentation network, output at least one semantic segmentation mask corresponding to the third image.

6. An electronic apparatus comprising:
a memory storing a decoder and a generative adversarial network (GAN) trained to generate an image based on input data; and
at least one processor configured to:
obtain a first image from the GAN by inputting data to the GAN,
input, to the decoder, a first feature value that is obtained from at least one intermediate layer of the GAN according to the inputting of the data to the GAN, and
obtain a first semantic segmentation mask from the decoder according to the input of the first feature value to the decoder,
wherein the at least one processor is further configured to obtain the first semantic segmentation mask corresponding to the first image from the decoder according to input of the first feature value.

7. The electronic apparatus of claim 6, wherein:
the decoder is trained based on a second feature value that is obtained from the at least one intermediate layer of the GAN and a second semantic segmentation mask that is added to a second image output from the GAN; and
the at least one processor is configured to input, to the trained decoder, the first feature value obtained from the at least one intermediate layer of the GAN, to obtain the first semantic segmentation mask.

8. The electronic apparatus of claim 6, further comprising:
a display,
wherein the at least one processor is further configured to control output, via the display, the first image and the first segmentation mask.

9. The electronic apparatus of claim 6, wherein the decoder is a light-weight decoder that has a smaller number of parameters than the GAN.

10. An electronic apparatus comprising:
a memory storing a decoder and a generative adversarial network (GAN) trained to generate an image based on input data; and
at least one processor configured to:
obtain a first image from the GAN by inputting data to the GAN,
input, to the decoder, a first feature value that is obtained from at least one intermediate layer of the GAN according to the inputting of the data to the GAN,
obtain a first semantic segmentation mask from the decoder according to the input of the first feature value to the decoder, and
based on the first image obtained from the GAN and the first semantic segmentation mask obtained from the decoder, train a semantic segmentation network to, based on a third image being input to the semantic segmentation network, output at least one semantic segmentation mask corresponding to the third image.

11. A non-transitory computer readable medium having stored therein a computer instruction executable by at least one processor of an electronic apparatus to perform a method comprising:
inputting data to a generative adversarial network (GAN) to obtain a first image from the GAN;
inputting, to a decoder, a first feature value that is obtained from at least one intermediate layer of the GAN according to the inputting of the data to the GAN; and
obtaining a first semantic segmentation mask from the decoder according to the inputting of the first feature value to the decoder,
wherein the obtaining the first semantic segmentation mask comprises obtaining the first semantic segmentation mask corresponding to the first image from the decoder according to the inputting of the first feature value.

12. The non-transitory computer readable medium of claim 11, wherein the method further comprises:
based on a second feature value that is obtained from the at least one intermediate layer of the GAN and a second semantic segmentation mask that is added to a second image output from the GAN, training the decoder to output a semantic segmentation mask based on a feature value obtained from the at least one intermediate layer of the GAN being input to the decoder,
wherein the inputting the first feature value comprises inputting the first feature value to the trained decoder.

13. The non-transitory computer readable medium of claim 11, wherein the method further comprises:
based on the first image obtained from the GAN and the first semantic segmentation mask obtained from the decoder, training a semantic segmentation network to, based on a third image being input the semantic segmentation network, output at least one semantic segmentation mask corresponding to the third image.

14. The non-transitory computer readable medium of claim 11, wherein the decoder is a light-weight decoder that has a smaller number of parameters than the GAN.

* * * * *